US00RE36106E

United States Patent [19]

Bruno et al.

[11] E Patent Number: Re. 36,106

[45] Reissued Date of Patent: Feb. 23, 1999

[54] SMOKELESS ASHTRAY

[75] Inventors: Robert H. Bruno, Avon, Conn.; Donald N. Jursich, Chicago, Ill.

[73] Assignee: The Rival Company, Kansas City, Mo.

[21] Appl. No.: 551,587

[22] Filed: Nov. 1, 1995

Related U.S. Patent Documents

Reissue of:

[64] Patent No.: 5,259,400
Issued: Nov. 9, 1993
Appl. No.: 818,849
Filed: Jan. 10, 1992

[51] Int. Cl.[6] ..... A24F 19/10

[52] U.S. Cl. ..... 131/238; 131/231; 55/385.8

[58] Field of Search ..... 131/231, 242, 131/238; 55/316, 385.8

[56] References Cited

U.S. PATENT DOCUMENTS

| | | |
|---|---|---|
| D. 155,048 | 8/1949 | Turulis . |
| D. 155,083 | 9/1949 | Frank . |
| D. 156,577 | 12/1949 | Strange . |
| D. 157,884 | 3/1950 | McNair . |
| D. 170,177 | 8/1953 | Wood . |
| D. 170,345 | 9/1953 | Vevirit . |
| D. 185,942 | 8/1959 | Ajdukovich . |
| D. 188,085 | 5/1960 | Redmond-Farrance . |
| D. 201,738 | 7/1965 | Karbo . |
| D. 258,316 | 2/1981 | Duin . |
| D. 274,645 | 7/1984 | Grube . |
| D. 280,555 | 9/1985 | Grube . |
| D. 281,618 | 12/1985 | Grube . |
| D. 297,374 | 8/1988 | Hilger . |
| D. 303,298 | 9/1989 | Grant . |
| D. 307,318 | 4/1990 | Hilger et al. . |
| 2,504,597 | 4/1950 | Sewald, Jr. . |
| 2,788,085 | 4/1957 | Waller . |
| 3,685,258 | 8/1972 | Kostel et al. . |
| 3,797,205 | 3/1974 | Weisskopf . |
| 3,807,148 | 4/1974 | Fike et al. . |
| 3,952,753 | 4/1976 | Klingler . |
| 3,957,643 | 5/1976 | Belz et al. . |
| 3,958,965 | 5/1976 | Raczkowski . |
| 3,966,442 | 6/1976 | Waters . |
| 4,043,776 | 8/1977 | Orel . |

(List continued on next page.)

FOREIGN PATENT DOCUMENTS

| | | | |
|---|---|---|---|
| 30 17 328 A1 | 11/1991 | Germany . | |
| 61-162165 | 7/1986 | Japan . | |
| 61-177973 | 8/1986 | Japan . | |
| 61-231988 | 10/1986 | Japan . | |
| 1130711 | 11/1987 | Japan | 55/385.8 |
| 6254325 | 9/1994 | Japan | 55/385.8 |
| 1014963 | 9/1984 | United Kingdom . | |

OTHER PUBLICATIONS

Copy of packaging for Pollenex Cordles Electric Smoke Grabber® Ashtray, 1992.

Copy of packaging for GP No. 1228 Smokeless Ashtray Cordless Electric.

Copy of packaging for Smokeless Ashtray, SKU #4D39110010, British Design No. 1014963, Model No. L-38.

Copy of instructions and warranty for Pollenex Cordless Electric Smoke Grabber® Ashtray, for Model Nos. AT50, AT60 and AT61, 1992.

Copy of order form for Pollenex Filters and Accessories, 1993.

*Primary Examiner*—William M. Pierce
*Attorney, Agent, or Firm*—Brinks Hofer Gilson & Lione

[57] ABSTRACT

An ashtray has a base with a lid hinged thereto. A filter is in the lid in order to accommodate an easy filter replacement. An air duct in the lid enables a fan in the base to draw smoke through the filter and out the base. The fan is operated in response to raising the lid to an upright position. The intake to the air duct is far enough from debris in the ashtray to preclude drawing the debris into the air duct. The lid tends to seal in odors when it is closed. An area in the base may also receive a filter in order to provide a compatibility with preexisting filters.

17 Claims, 1 Drawing Sheet

U.S. PATENT DOCUMENTS

| | | |
|---|---|---|
| 4,119,419 | 10/1978 | Passaro et al. . |
| 4,148,618 | 4/1979 | Christenson et al. . |
| 4,154,251 | 5/1979 | Doyel . |
| 4,161,181 | 7/1979 | Nicks et al. . |
| 4,177,045 | 12/1979 | Orel . |
| 4,316,434 | 2/1982 | Bailey . |
| 4,534,369 | 8/1985 | Jenkins . |
| 4,580,582 | 4/1986 | Grube et al. . |
| 4,623,367 | 11/1986 | Paulson . |
| 4,671,300 | 6/1987 | Grube et al. . |
| 4,811,159 | 3/1989 | Foster, Jr. . |
| 4,883,224 | 11/1989 | Sun . |
| 4,996,995 | 3/1991 | Kojima . |
| 5,065,272 | 11/1991 | Owen et al. . |

SMOKELESS ASHTRAY

Matter enclosed in heavy brackets [ ] appears in the original patent but forms no part of this reissue specification; matter printed in italics indicates the additions made by reissue.

This invention relates to smokeless ashtrays and more particularly to ashtrays which stay cleaner than conventional smokeless ashtrays and which have filters that are easier to replace than on conventional smokeless ashtrays.

An example of a smokeless ashtray is found in U.S. Pat. No. 4,671,300. As with the inventive ashtray, the patented ashtray uses a filter to create the smokeless effect. However, in the ashtray of U.S. Pat. No. 4,671,300, the chore of replacing the filter requires a minor amount of dismemberment of the ashtray and more manipulation of the spent filter than most people find acceptable, especially since the spent filter is covered with tobacco "tar". This "tar" can easily dirty ones hands, along with depositing nicotine stains on them. Another problem with U.S. Pat. No. 4,671,300 is that the fan provided in such ashtrays to draw the smoke also tends to draw ashes (and sometimes butts) from the tray, deliver them out the bottom of the ashtray, and deposit them on a supporting surface, such as a table or desk top on which the ashtray is resting.

Another consideration is a need to be compatible with equipment already in the field. For example, many stores have in stock a large supply of filters for the ashtray of U.S. Pat. No. 4,671,300, which they want to sell. Therefore, although the preferred filter location is in the ashtray lid, it is desirable to also provide an ashtray which accepts the existing filters. Moreover, it is always possible that some users may prefer the existing in-base filter system and wish to continue using it.

Accordingly, an object of the invention is to provide a new and improved smokeless ashtray. Here, an object is to make the filters of these ashtrays easier and more convenient to replace than with prior art smokeless ashtrays. Still another object is to eradicate some of the tendencies of the prior art smokeless ashtrays to scatter ash and sometimes butts over an area adjacent to the ashtray.

A further object of the invention is to provide an ashtray which may use filters taken from the existing supply of in-base filters. Here, an object is to provide an alternative in-base filter for those who may prefer this alternative.

Other objects of the invention are to provide a more compact ashtray which encloses the debris, ashes and butts, and to reduce odor in the vicinity of the ashtray.

In keeping with an aspect of the invention, these and other objects are accomplished within a box-like structure having a lid for enclosing the interior of the ashtray when not in use. The fact that the contents of the ashtray are entirely enclosed already provides some insurance that the odor of the ashes and butts will not reach the area surrounding the ashtray if it is not emptied after use. In addition, the cover of the ashtray contains a filter which may be replaced quickly and easily from a convenient work position. The ashtray's fan draws smoke into the filter but is not close enough to the debris in the ashtray to suck in the ashes or butts, as is sometimes a recurrent problem with prior art smokeless ashtrays.

A preferred embodiment of the inventive smokeless ashtray is seen in the attached drawings, in which.

Figure 1:
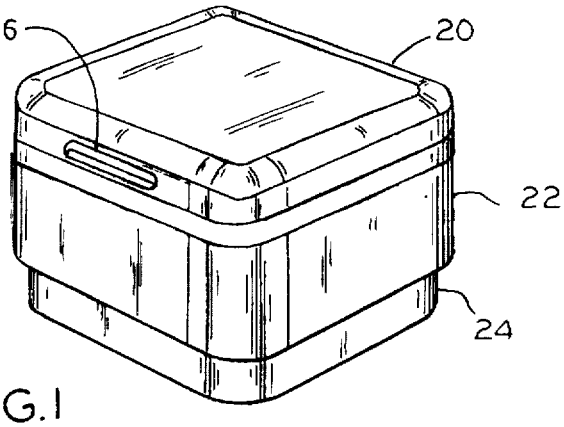
FIG. 1 is a perspective view of the inventive ashtray in a closed condition.

FIG. 1 shows the inventive smokeless ashtray having a top lid 20 and a base 22 mounted on a pedestal 24. The top includes a groove or protrusion 26 which may be used to lift the lid. The ashtray operates only when the lid is in a raised position. When the lid is in a closed position, as shown in FIG. 1, the ashes, butts, etc. are enclosed and, therefore, the area surrounding the ashtray is fairly odor-free.

Figure 2:
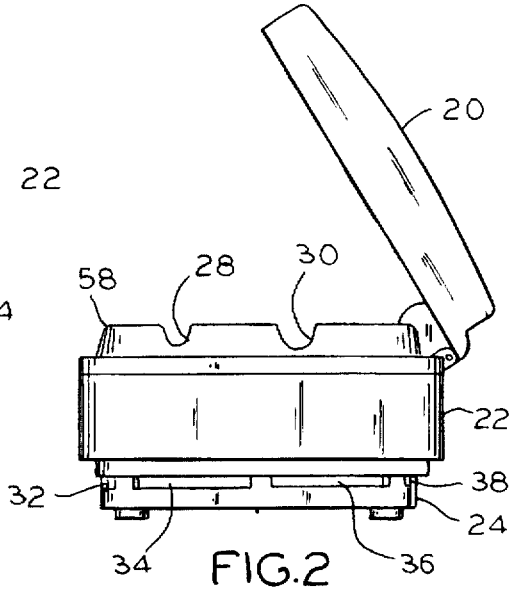
FIG. 2 is a side elevation of the ashtray with the lid partially open.
Figure 4:
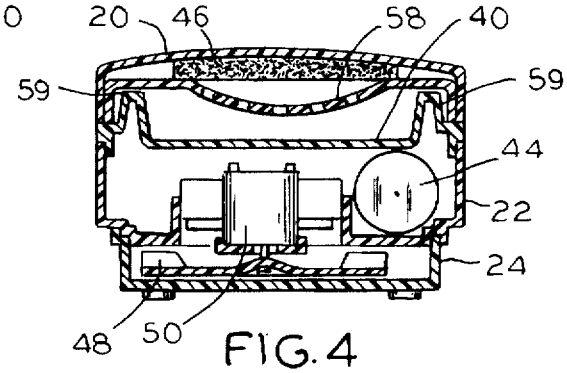
FIG. 4 is a cross-section of the closed ashtray taken along line 4—4 of FIG. 3.
Figure 5:
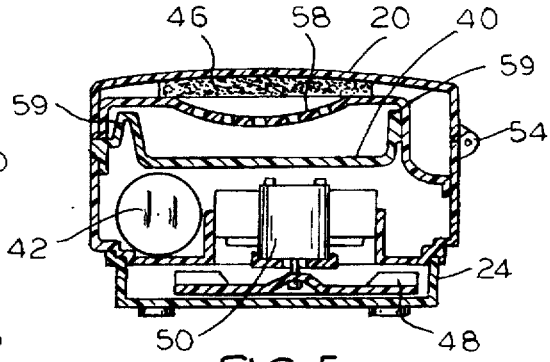
FIG. 5 is a cross-section of the closed ashtray taken along line 5—5 of FIG. 3.
Figure 6:
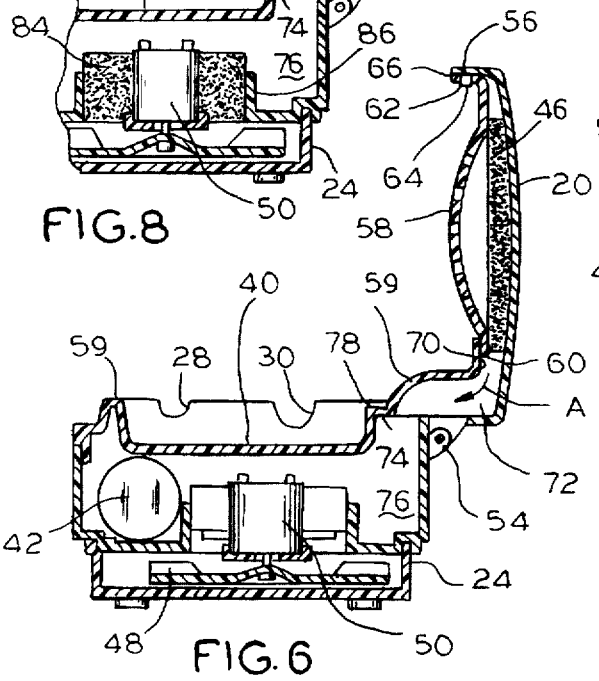
FIG. 6 is a cross-section, also taken along line 5—5 of FIG. 3, with the lid open.

FIG. 2 shows the lid 20 partially raised to reveal several notches 28, 30, which are notches of different sizes, used to support a cigarette, or a cigar, respectively. The ashes deposited from such cigarettes and cigars are caught in a dish-shaped member 40 (FIGS. 4–6). The periphery of pedestal 24 (FIG. 2) contains air discharge ports 32, 34, 36, 38.

Figure 3:
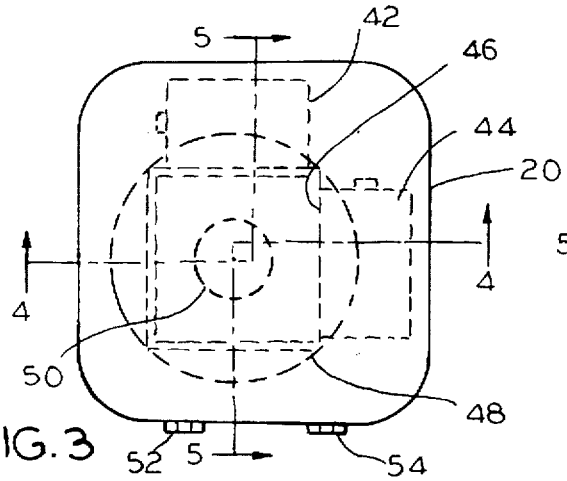
FIG. 3 is a plan view looking down on the top of the inventive ashtray.

FIG. 3 is a top plan view which shows a position of two drycell batteries 42, 44, a filter 46, a fan 48, and a motor 50 used to drive the fan. The hinges 52, 54 mount lid 20 on the base 22 so that it may swing between a closed position (FIG. 5) and an open position [(FIG. 6)].

The lid construction is best seen in FIGS. 4, 5, 6. A first and outer part 56 of the lid is a closed box-like member which fits fairly closely over upstanding rim 59. The somewhat tight fit efficiently closes in and contains the odor of the ashtray debris. A second and inner part of the lid is a perforated, somewhat dome-like member 58 having one or more capture tabs 60 on one side. A plurality of keeper holes 62 are formed on the other side of member 58. These keeper holes 62 receive embossments 64 on the outer lid member 56 in order to lock the dome-like member 58 in place. A small space 66 between outer and inner lid parts 56, 58 enables a user to insert a fingernail and pull keeper hole 62 away from embossment 64, thereby removing the inner lid part 58 and exposing a filter 46.

The filter 46 uses an activated charcoal and is made of substantially the same material as that described in U.S. Pat. No. 4,671,300. When the inner lid part 58 is removed, the filter 46 is also easily removed from outer lid part 56, so that it all but falls out. When a new filter is installed it is simply pushed into outer lid part 56, with almost no force necessary to push this filter into place. In fact, only enough friction is needed to hold it in place while the inner lid part 58 is returned to lock it in place. In order to so return lid part 56, the capture tabs 60 are slipped behind a duct wall 70 on the outer lid part 56. Then, the upper portion of inner part 58 is pushed inwardly until the keeper holes 62 snap over the embossments 64. At this point, the filter installation has been completed, and the installer is unlikely to have dirtied his hands if he has been reasonably careful.

Figure 7:
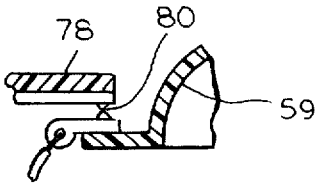
FIG. 7 is a fragment of FIG. 6 showing a lid-controlled switch for operating the motor.

The lower or hinged side or outer lid part 56 is an air duct 72 which terminates in a toe 74, best seen in FIG. 7. The duct extends an enclosed air path from filter 46 to a motor and fan compartment 76. [Toe 74 engages a ledge 78 (FIG. 7) which holds the lid in the upright slightly over center position, under the force of gravity.] When the ledge is engaged, a set of contacts 80 close to start the motor 50 and therefore, at the same time, fan 48. The fan 48 draws air through an air path including filter 68, duct 72 and out the outlet ports 32–38. In doing so, any smoke from cigarettes or cigars is pulled into the air path through perforated dome 58. The draft of air created by this operation of the fan is relatively remote from the tray 40; therefore, the debris contained in the tray is neither attracted into the air path nor discharged from the ports 32–38 and onto the surface below the ashtray.

While the foregoing specification has described a battery driven D.C. motor, it should be understood that the invention also contemplates a use of other suitable power sources. For example, a standard 110 volt electrical cord may take power from a suitable wall outlet. On the other hand, an adapter may be used to power the motor from an automobile battery, as by plugging into a cigarette lighter socket. Still another suitable power supply may utilize a wall transformer which is mounted on a wall outlet and which may furnish any suitable D.C. voltage, such as 3V, 9V, etc. Any combination of these or other power supplies may be used.

Figure 8:
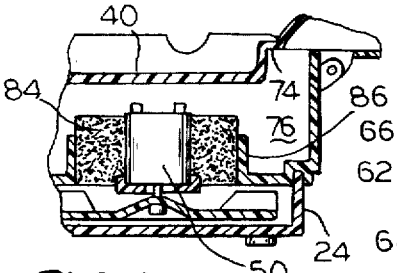
FIG. 8 is a fragment taken from FIG. 6 which shows an inbase filter surrounding the motor, as an alternative to the inlid filter disclosed in FIG. 6.

FIG. 8 shows an alternative way of providing for an in-base filter of the type shown in U.S. Pat. No. 4,671,300 so that all filters in the field will not be made obsolete. More particularly, the tray 40 may be lifted out of the base and filter 84 may be dropped into the space surrounding motor 50 and contained within box 86. Of course, there is no reason for providing two filters, one in the lid and one in the base, however, the user may do so, if he wishes.

Those who are skilled in the art will readily perceive how to modify the invention. Therefore, the appended claims are to be construed to cover all equivalent structures which fall within the true scope and spirit of the invention.

The invention claimed is:

1. A lidded ashtray comprising a lid hinged to a base containing an ashtray and having an outside perimeter, [said hinge being located at said perimeter of said ashtray], said lid [having a center of gravity and] *adapted to* [fitting] *fit* over and [enclosing] *enclose* said ashtray *substantially over said perimeter* when closed over said base, means for swinging said lid on said hinge to close said ashtray when it is not in use or away from said ashtray to an upstanding position when said ashtray is in use, [the center of gravity of said lid being outside said perimeter of said ashtray when said lid is in said upstanding position so that said lid is held in said upstanding position under the force of gravity,] an air duct in said lid, a filter mounted in said air duct, said air duct extending from an inlet in said lid across said lid through said filter and on into said base, and motor/fan means in said base for drawing smoke through said air duct and into [an] *and* exhausted from said base in response to moving said lid to said upstanding position, whereby said filter mounted in said lid filters said air after it enters said air duct and before it is exhausted from said base.

2. The ashtray according to claim 1 wherein said filter comprises activated charcoal, means for holding said filter in said lid, and means for replacing said filter by removing a it out of said lid and by pushing a fresh filter into the same place in said lid.

3. The ashtray according to claim 1 wherein said lid comprises a first part for enclosing said ashtray to reduce odors therefrom, and a second part for retaining said filter and for admitting air into said filter,, said parts of said lid cooperating to provide said air duct for conveying air from said filter to said fan.

4. The ashtray according to claim 3 wherein a first part of said lid is fitted to said base, said first part of said lid containing said filter, said fitter using activated charcoal.

[5. A smokeless ashtray comprising a base and a lid hinged to said base to move between closed and upstanding positions, when in said upstanding position said lid having a center of gravity positioned outside a perimeter of said base, a filter including activated charcoal, a motor driven fan in said base, said lid having an air duct for receiving and forwarding a draft of air from a location above said base to said fan in said base, said air duct extending from an air inlet in said lid to an air entrance into said base which is completed when said lid is upstanding, said upstanding lid being in a position where said air intake is above means in said ashtray for receiving smoking debris and in a position to couple an opposite end of said air duct through said air entrance and into said base, means for supporting said filter in said air duct for filtering said draft of air which passes through said air duct, means for operating said fan responsive to moving said lid to said upstanding position, and said means for receiving smoking debris being at a location in said ash tray which is far enough from said intake of said air duct to preclude drawing said debris into said duct and close enough to said intake to draw substantially all smoke into said duct.]

6. [The ashtray of claim 5 wherein said lid has] *A smokeless ashtray comprising a base and a lid hinged to said base to move between closed and upstanding positions, said lid closely fitting over said base when in said closed position, a filter including activated charcoal, a motor driven fan in said base, said lid having an air duct for receiving and forwarding a draft of air from a location above said base to said fan in said base, said air duct extending from an air inlet in said lid to an air entrance into said base which is completed when said lid is upstanding, said upstanding lid being in a position where said air intake is above means in said ashtray for receiving smoking debris and in a position to couple an opposite end of said air duct through said air entrance and into said base, means for supporting said filter in said air duct for filtering said draft of air which passes through said air duct, means for operating said fan responsive to moving said lid to said upstanding position, and said means for receiving smoking debris being at a location in said ash tray which is far enough from said intake of said air duct to preclude drawing said debris into said duct and close enough to said intake to draw substantially all smoke into said duct, said lid having,* two parts, a first of said parts comprising means for closing over and containing the odor of said debris, and a second of said parts providing means for securing said filter in said lid and for admitting said smoke into said air duct.

7. The ashtray of claim 6 wherein said second part of said lid is a perforated dome having at least two sides, and means on one of said sides of said perforated dome part for holding it in place, and means on another side of said perforated dome part for locking it in place.

8. The ashtray of claim 7 wherein said means for holding said perforated dome comprises tabs which fit within said air duct, and said means for locking it in place comprise keeper holes in said perforated dome which snap over mating embossments on said first part of said lid.

9. The ashtray of claim 8 and means between said parts of said lid for receiving a finger nail in order to snap apart said keeper and embossment to remove said perforated dome.

10. The ashtray of claim 9 and an upstanding rim surrounding said means for receiving said smoking debris, said first part of said lid fitting against said upstanding rim.

*11. A pivotably lidded ashtray comprising:*

*a lid attached by a hinge to a base containing an ash retaining means, said lid pivotably positionable between a raised and closed position about said hinge;*

*means for holding said lid in said raised position;*

*an air intake in said lid;*

*a plurality of exhaust ports in said base;*

*an air duct defining an air path from said air intake in said lid into said base, and out said exhaust ports, said air duct rigidly connected to said lid;*

*a filter mounted across said air path;*

*said lid, when in said closed position, substantially enclosing said ash retaining means; and*

*a motor and fan mounted in said base for drawing smoke from above said base through said intake, filter, and air duct and exhausting said smoke through said exhaust ports.*

*12. The lidded ashtray as defined in claim 11 further comprising a set of contacts activating said motor upon placing said lid in said raised position.*

*13. The lidded ashtray as defined in claim 11 wherein said filter is positioned in said lid.*

*14. The lidded ashtray as defined in claim 11 wherein said filter is mounted in said base.*

*15. The lidded ashtray as defined in claim 11 wherein said air duct is defined through said hinge.*

*16. The lidded ashtray as defined in claim 11, wherein said means for holding said lid in said raised position further comprises a toe rigidly connected to said lid and a ledge rigidly connected to said base, said toe engageable with said ledge to hold the lid in a raised position.*

*17. The lidded ashtray as defined in claim 12 wherein when in said raised position, said lid is positioned at an angle acute to said closed position.*

*18. The lidded ashtray as defined in claim 15 wherein said lid can be positioned at more than one angle to said closed position.*

* * * * *